United States Patent [19]
Russold et al.

[11] 3,900,190
[45] Aug. 19, 1975

[54] SPRING ASSEMBLY

[75] Inventors: Maximilian Russold; Raimund Scheck; Heribert Sidan, all of Judenburg, Austria

[73] Assignee: Steirische Gusstahlwerke Aktiengesellschaft, Vienna, Austria

[22] Filed: Sept. 13, 1973

[21] Appl. No.: 396,739

[52] U.S. Cl. ................... 267/9 B; 267/168
[51] Int. Cl. ............................. F16f 3/06
[58] Field of Search ............ 267/168, 9 B, 4

[56] References Cited
UNITED STATES PATENTS

| | | | |
|---|---|---|---|
| 879,545 | 2/1908 | Hien | 267/9 B |
| 1,938,099 | 12/1933 | Endsley | 267/9 B |
| 2,466,087 | 4/1949 | Endsley | 267/9 B |
| 2,466,094 | 4/1949 | Frost, Jr. | 267/9 B |
| 3,073,585 | 1/1963 | Hanle | 267/9 B |

*Primary Examiner*—James B. Marbert
*Attorney, Agent, or Firm*—Holman & Stern

[57] ABSTRACT

The spring assembly has an axis and is adapted resiliently to take up and exert force in the direction of said axis and comprises resilient rings which are axially stacked in alternation with rigid rings. Said rigid rings are formed on the outside with peripheral sliding surfaces which have generatrices which have portions having different inclinations to said axis. Said resilient rings surround said sliding surfaces and bear thereon in line contact therewith.

8 Claims, 21 Drawing Figures

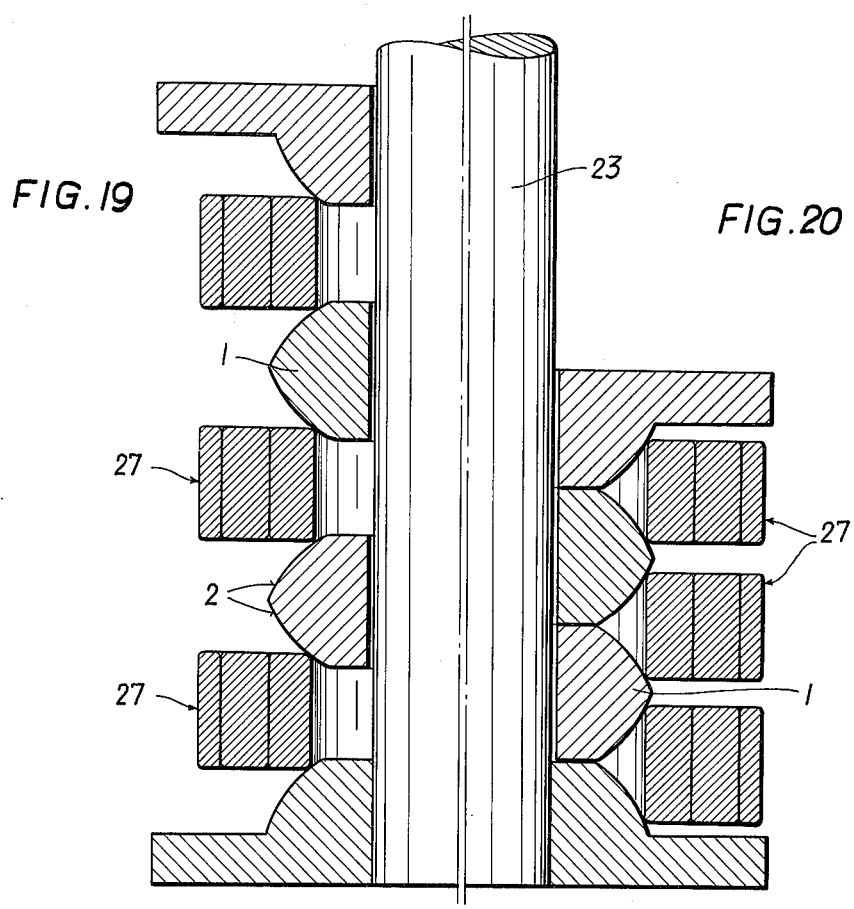
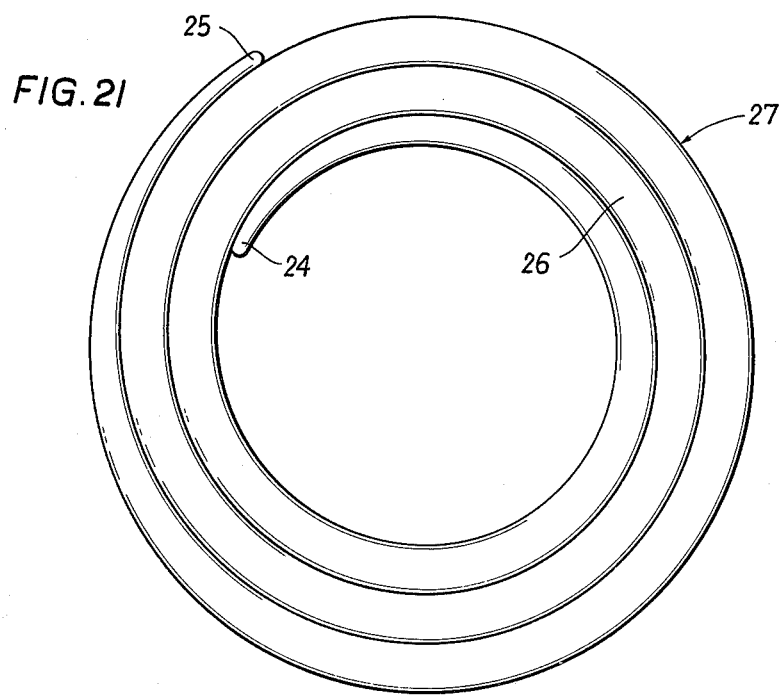

SPRING ASSEMBLY

This invention relates to a spring assembly which comprises a plurality of rings which are stacked in the direction of force action in such a manner that resilient rings and rigid rings alternate and the resilient rings bear on sliding surfaces of the rigid rings, which have curved or angled generatrices which are inclined to the axis of the spring. Such spring assemblies are known per se and have the advantage that they possess a high energy storage capacity and, if they comprise a sufficiently large number of stacked rings resulting in a correspondingly large axial length, are capable of a relatively large excursion. The use of curved or angled generatrices afford the advantage that the spring characteristic can be varied greatly. The resilient rings are in line contact with the sliding surfaces of the rigid rings so that the resilient rings during their sliding movement can follow the configuration of the generatrices. The known spring assemblies of this kind are designed so that the resilient rings are disposed on the inside and cooperate with surrounding hollow-conical sliding surfaces of the rigid rings.

It is an object of the invention to improve such spring assembly. The invention resides essentially in that the resilient rings embrace in known manner sliding surfaces formed on the outside of the rigid rings. The spring action of the resilient rings will depend in a high degree on their diameter. Because the resilient rings are disposed on the outside, the diameter of the spring assembly is limited to the outside diameter of the resilient rings so that the spring assembly is smaller in diameter whereas the advantages by this designs are preserved. Such decrease in diameter is of decisive significance because in many applications of such spring assembly, particularly where it is used as a buffer spring for railroad cars, as is preferred, the dimension of the space which is available in the direction of the diameter of the spring is limited.

The resilient rings may simply be axially slit so that they can resiliently expand. According to the invention the resilient rings may consist of plane spiral springs having at least two and preferably at least three convolutions which are approximately rectangular in cross-section. In such an arrangement, the friction between the convolutions result in a higher energy storage capacity of the spring. In the design according to the invention in which the resilient rings embrace sliding surfaces on the outside of the rigid rings, the advantage is afforded that in case of a breakage of the spring only one convolution can break so that the resilient ring remains effective although with a reduced force. In a spring assembly in which the resilient rings are disposed on the inside and are embraced by the sliding surfaces of the rigid rings, this advantage is less significant because in such springs even a broken simple spring ring is still held together by the sliding surfaces.

Embodiments of the invention are shown by way of example on the drawing, in which FIGS. 1 and 2 are axial sectional views showing a spring assembly, which is shown in a relaxed state in FIG. 1 and in a fully loaded state in FIG. 2.

FIGS. 19 and 20 are sectional views showing a spring assembly which comprises a different resilient ring.

FIG. 21 is a top plan view showing the corresponding resilient ring.

Figures 1, 2:
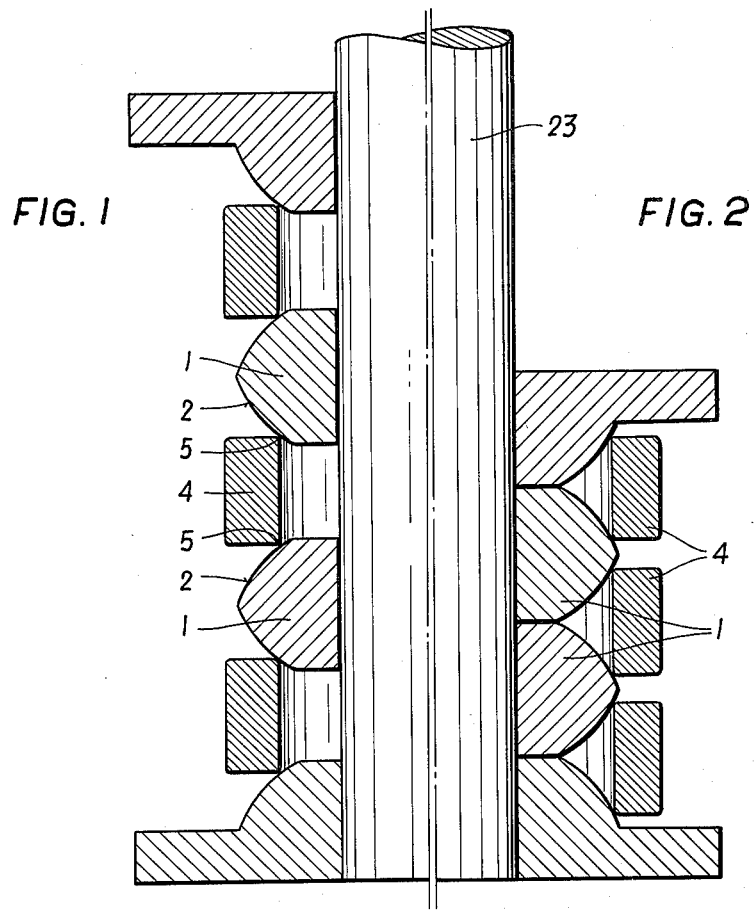
Figure 3:
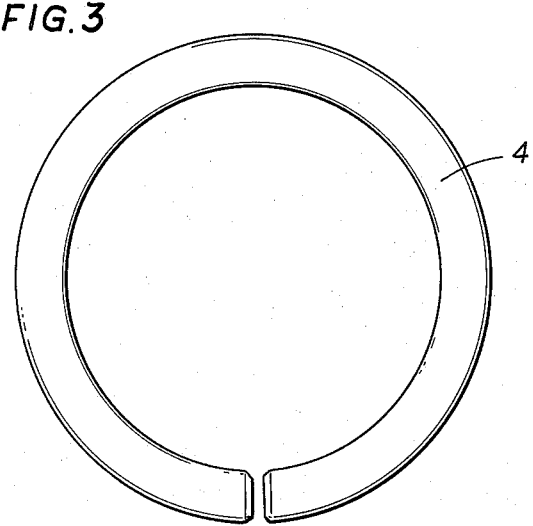
FIG. 3 is a top plan view showing a resilient ring.

In the embodiment shown in FIGS. 1 to 3, rigid rings 1 are guided on a rod 23 and are formed with sliding surfaces 2 having curved generatrices. These sliding surfaces are embraced by resilient rings 4, which have edges 5 which are in sliding line contact with the sliding surfaces 2. As is shown in FIG. 3, the resilient rings 4 are axially slit. When the spring assembly is compressed, the resilient rings 4 expand and slide resiliently down on the sliding surfaces 2 of the rigid rings.

Figure 4:
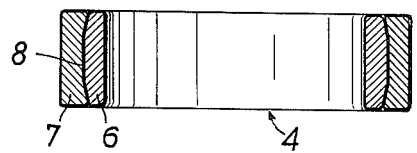
FIG. 4 and FIG. 5 are transverse sectional views showing modified resilient rings.

FIG. 4 shows an embodiment of a resilient ring which is composed of two parts 6 and 7. The two parts 6 and 7 consist of slit rings, which lie one in the other under initial stress and have curved surfaces 8 to prevent an axial displacement of the rings 6 and 7 relative to each other.

Figure 5:
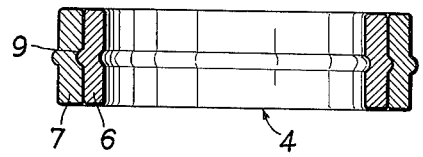

The ring shown in FIG. 5 differs from the one shown in FIG. 4 only in that the two parts 6 and 7 are held against a relative axial displacement by a tongue-and-groove joint 9.

Figure 6:
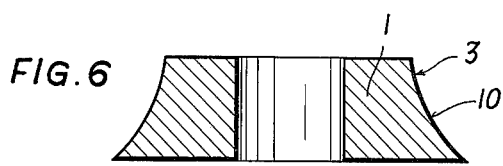
FIGS. 6 to 15 show various configurations of sliding surfaces of rigid rings and the corresponding spring characteristics.
Figure 7:
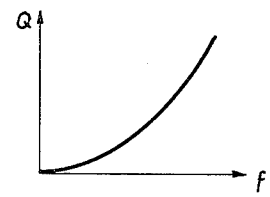
Figure 8:
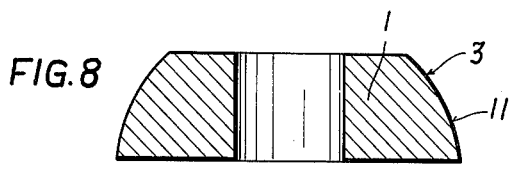
Figure 9:
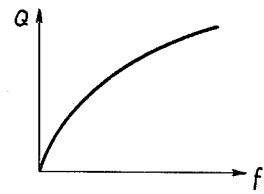
Figure 10:
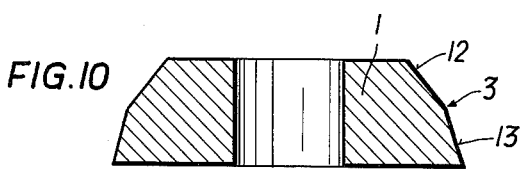
Figure 11:
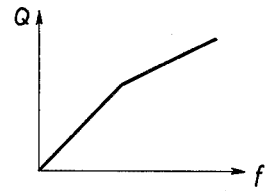
Figure 12:
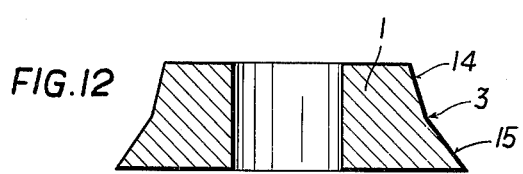
Figure 13:
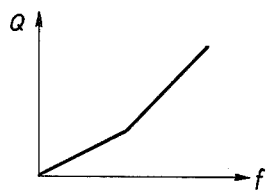
Figure 14:
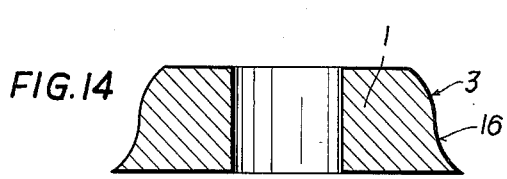
Figure 15:
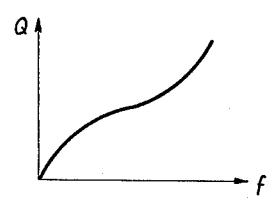
Figure 16:
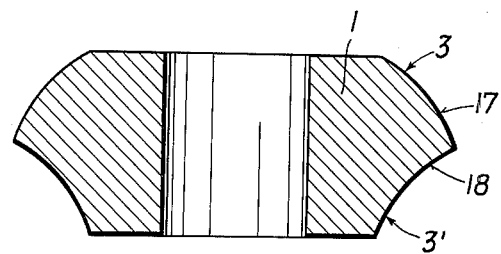
FIG. 16 shows by way of example the sliding surfaces of a rigid ring as used according to FIGS. 1 and 2.
Figure 17:
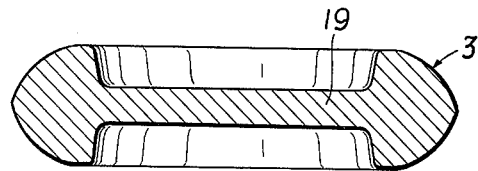
FIGS. 17 and 18 show modified rigid rings.
Figure 18:
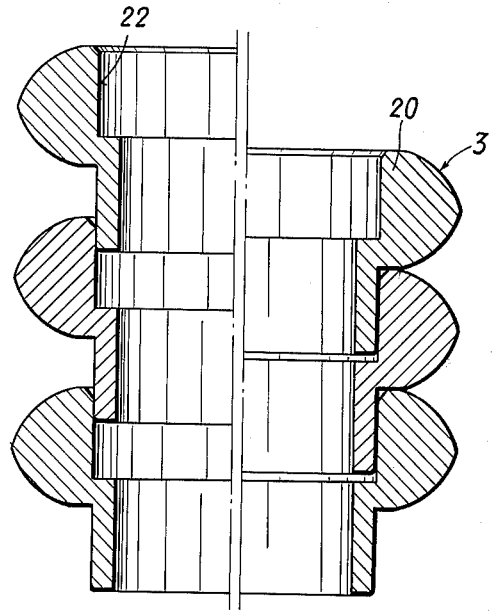

Because the resilient rings 4 are only in line contact with the sliding surfaces 3, the resilient rings 4 can follow the sliding surfaces regardless of the configuration of the latter. In the embodiment shown in FIG. 6, the sliding surface 3 is concave and has curved generatrices 10. This results in a spring characteristic increasing in slope as shown in FIG. 7, where the load q is plotted along the axis of ordinates and the spring excursion f along the axis of abscissae. FIG. 8 shows an embodiment having a sliding surface 3 with convexly curved generatrices. This results in a spring characteristic decreasing in slope, as shown in FIG. 9. The sliding surface 3 shown in FIG. 10 has two straight generatrix portions 12 and 13 having different inclinations. This results in an angled spring characteristic as shown in FIG. 11. According to FIG. 3, the sliding surface 3 is formed in accordance with straight generatrix portions 14 and 15 which include a re-entrant angle. This results in the angled spring characteristic of FIG. 13, which increases in slope. The sliding surface 3 shown in FIG. 14 is formed in accordance with a generatrix 16 curved in S-shape. This results in the S-shaped spring characteristic which is shown in FIG. 15 and which first decreases and then increases in slope. FIG. 16 shows a rigid ring having sliding surface portions 3 and 3'. These sliding surface portions are formed in accordance with different curved generatrix portions 17 and 18 so that a compound spring characteristic is obtained. FIG. 17 shows a rigid ring 19 having sliding surfaces 3 formed in accordance with curved generatrices. This ring is intended for a spring assembly in which there are no means for guiding the rigid rings. Such spring assembly may readily be incorporated, e.g. in a tube. FIG. 18 shows rigid rings 20 which have at one end a cylindrical extension 21 and at the other end a cylindrical recess 22 which is complementary to the cylindrical extension. In this embodiment the rigid rings are telescopically guided one in the other without a rod.

FIGS. 19 to 21 shows an embodiment in which resilient rings 27 are used instead of the resilient rings 4 of FIGS. 1 and 2 and consist each of a flat spiral spring of stock which is rectangular in cross-section. The spring has three convolutions. The end portions 24 and 25 of the spiral 26 have a wedgelike taper approximately throughout one convolution. The convolutions contact each other even when the ring is relaxed so that the resilient ring 27 has a damped spring action and a high energy storage capacity. Even in case of a breakage of the spring there will be convolutions which remain intact and enclose the rigid rings 1 so that a spring action is preserved although it is smaller. The embodiment shown in FIGS. 19 and 20 corresponds to that of FIGS. 1 and 2 with the only difference that the slit rings 4 have been replaced by the spiral springs 27, one of which is shown in a relaxed state in FIG. 19 and in its fully loaded state in FIG. 20.

What is claimed is:

1. A spring assembly which has an axis and is adapted resiliently to take up and exert a force in the direction of said axis and comprises resilient rings which are axially stacked in alternation with rigid rings, said rigid rings being formed on the outside with peripheral sliding surfaces which have angled generatrices having different inclinations to said axis, said resilient rings surrounding said sliding surfaces and bearing thereon in line contact therewith.

2. A spring assembly which has an axis and is adapted resiliently to take up and exert a force in the direction of said axis and comprises resilient rings which are axially stacked in alternation with rigid rings, said rigid rings being formed on the outside with peripheral sliding surfaces which have curved generatrices, said resilient rings surrounding said sliding surfaces and bearing thereon in line contact therewith.

3. A spring assembly as claimed in claim 1, in which said resilient rings are slit.

4. A spring assembly as claimed in claim 1, in which each of said resilient rings consists of a plane spiral spring having at least two convolutions of stock which is substantially rectangular in cross-section.

5. A spring assembly as claimed in claim 1, in which each of said spiral springs has at least three of said convolutions.

6. A spring assembly as claimed in claim 2, in which said resilient rings are slit.

7. A spring assembly as claimed in claim 2, in which each of said resilient rings consists of a plan spiral spring having at least two convolutions of stock which is substantially rectangular in cross-section.

8. A spring assembly as claimed in claim 2, in which each of said spiral springs has at least three of said convolutions.

* * * * *